E. SAMUELSON.
TRACE HOOK.
APPLICATION FILED MAR. 30, 1914.
1,127,288.
Patented Feb. 2, 1915.
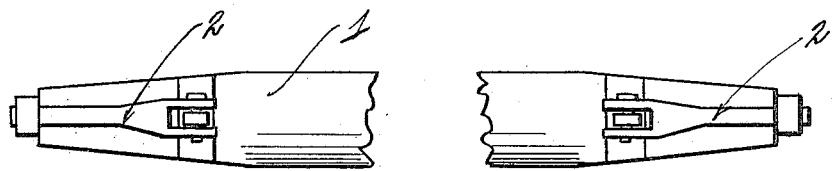
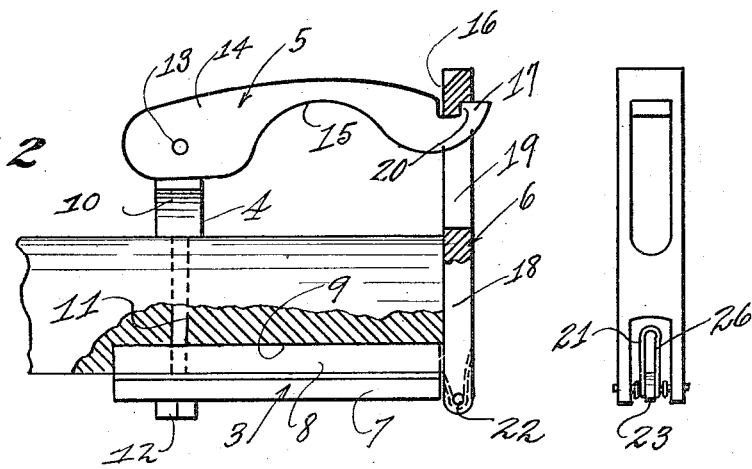
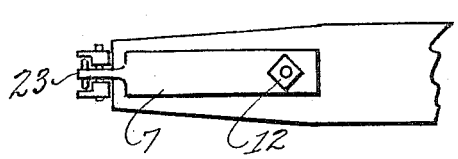
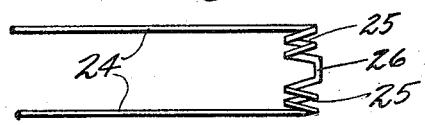
Inventor
Emil Samuelson.

UNITED STATES PATENT OFFICE.

EMIL SAMUELSON, OF McKENZIE, NORTH DAKOTA.

TRACE-HOOK.

1,127,288.     Specification of Letters Patent.     Patented Feb. 2, 1915.

Application filed March 30, 1914. Serial No. 828,361.

*To all whom it may concern:*

Be it known that I, EMIL SAMUELSON, a citizen of the United States, residing at McKenzie, in the county of Burleigh and State of North Dakota, have invented certain new and useful Improvements in Trace-Hooks; and I do hereby declare the following to be a full, clear, and exact description of the invention, such as will enable others skilled in the art to which it appertains to make and use the same.

This invention relates to new and useful improvements in trace hooks, and has for its principal object to provide a device which will securely lock the traces or tugs in place on the swingle tree.

Another object of the invention is to provide a simple and effective lock which will prevent the traces from becoming unhooked and thereby eliminate much inconvenience and much of the danger accompanying the driving a team.

A further object of the invention is to provide a simple and effective device which is arranged to be secured to a swingle tree without materially changing the construction thereof in any way.

With these and other objects in view, the invention consists in the novel combination and arrangement of parts which will be fully set forth in the following specification and accompanying drawings, in which, Figure 1 is a side view in elevation of a swingle tree showing this improved device as it would appear when applied thereto, portions of said swingle tree being broken away to assist in the illustration, Fig. 2 is an enlarged detail view of a fragment of the end of the swingle tree showing the hook as it would appear when in position, portions of said hook and swingle tree being broken away to more clearly illustrate the details of construction, Fig. 3 is a rear view of a fragment of the swingle tree showing the device in position, Fig. 4 is an end view of Fig. 2, and Fig. 5 is a detail view of the spring which is used in connection with this device.

Referring now to the drawings by characters of reference, the numeral 1 designates a swingle tree of the usual construction having this improved swingle tree hook designated generally by the numeral 2, secured thereto. This swingle tree hook comprises four coöperating elements designated generally by the numerals 3, 4, 5, and 6, respectively.

Taking up the several elements in order as named above, the element 3, which forms the base plate of the device, comprises the main body portion 7 which is provided with an aperture near one end, the use of which will appear as the description proceeds. A longitudinal tongue 8 is formed integral with the body portion 7 centrally of its lateral extremities, and is arranged to seat within the recess 9 formed in the swingle tree 1 as clearly illustrated in Fig. 2. A suitable hinge connection is formed at the end of the body portion 7 opposite the apertured end and is arranged to pivotally hold the hinged member 6, which will be more fully described hereafter, in place.

The next member in order is the member 4 which comprises the main body portion or post 10, having formed integral therewith the cylindrical extension 11 which is arranged to project through a suitable aperture formed in the swingle tree and into the aperture formed in the body portion 7. This cylindrical extension 11 is preferably screw threaded at the end opposite the body portion 4, and is arranged to receive the nut 12 by means of which the same is firmly held in place. The end of the body portion 10 opposite the cylindrical extension 11 is preferably bifurcated and is arranged to receive the pivot pin 13 by means of which the member 5 is pivotally secured to the swingle tree.

The member 5 hereinbefore referred to, preferably comprises the main body portion 14 which is reduced intermediate its ends as at 15 and is provided with a suitable aperture in one of its ends to receive the pin 13 by means of which it is pivotally secured to the member 4 hereinbefore mentioned. The end of the member 5 opposite the apertured end is provided with the recess 16 which is arranged to form the lip or extension 17 as clearly shown in Fig. 2.

Now proceeding with the description of the member 6, the same comprises the body portion 18 having formed near one end the longitudinally extending slot 19, one terminal of which is shouldered as at 20 to form a lug to engage the lip 17 and hold the device in its closed position. The end of the body portion 18 opposite the slotted end 20 is provided with the centrally located recess 21, and is pivotally secured as at 22 to the extension 23 formed on the body portion 7 of the member 3.

The spring illustrated in Fig. 5 which is used in connection with the device, is preferably formed of a single piece of wire designated by the numeral 24 which is coiled as at 25 and bent to form the U-shaped member 26, which is arranged to lie at substantially right angles to the portion 24 and exert pressure against the bottom wall of the recess 21 to force the free ends of the members 5 and 6 toward each other.

It will be apparent from the foregoing that in use the body portion 7 of the member 3 is placed in position on the swingle tree and the cylindrical extension 11 formed on the member 4 passed through the aperture formed in the swingle tree and through the aperture in the body portion 7 and when the nut 12 is placed on the cylindrical extension 11 and drawn up tight, it will be evident that the plate will be firmly held in position. The pivoted member 6, which is secured to the plate at 22, is normally held at right angles to the plate through the means of the spring 24, and it will be apparent upon referring to Fig. 2 that when the member 6 is swung upwardly into the position shown, that the shouldered portion 20 will engage the lug 17 and hold the device in its locked position. Should it be desired to release the device, pressure is exerted against the free end of the member 5 and it will be apparent that the lip 17 will pass from engagement with the shoulder 20 and the member 6 may then be swung downwardly and the member 5 outwardly to permit the trace to be slipped from beneath the same, thus providing a device by means of which an animal may be easily and quickly released from the vehicle.

While in the foregoing there has been shown and described the preferred embodiment of this invention, it is to be understood that such changes may be made in the combination and arrangement of parts as will fall within the spirit and scope of the invention as defined in the appended claim.

Having thus described my invention, I claim:

A swingle tree hook comprising a plate adapted to be secured to the swingle tree, a latch member hingedly secured to the plate, a spring adapted to exert pressure against the latch member and hold the same at right angles with relation to the plate, a projection adapted to be secured to the swingle tree on the side opposite the plate, a cylindrical extension formed on the projection and adapted to extend through the swingle tree and through the plate, a pawl carried by the extension, the free end of said pawl being adapted to engage the latch member to hold the latch member against movement, said pawl being arranged to receive the end of a trace to hold the same firmly in place on the end of the swingle tree.

In testimony whereof I affix my signature in presence of two witnesses.

EMIL SAMUELSON.

Witnesses:
J. B. SWANICK,
P. P. BLISS.